(12) United States Patent
Klein et al.

(10) Patent No.: US 11,966,571 B2
(45) Date of Patent: Apr. 23, 2024

(54) PFAS REMEDIATION OPTION EXPLORER TOOL

(71) Applicant: The MITRE Corporation, McLean, VA (US)

(72) Inventors: Gary Lee Klein, Reston, VA (US); Ryan Douglas Hollins, Rockville, MD (US); Mark Stephen Pfaff, Woburn, MA (US); Brittany Allison Tracy, Garden City, GA (US); Elizabeth Haines, Bellingham, MA (US); James Alex Philp, Missoula, MT (US); Jay Nathan Lustig, Nashua, NH (US); Thomas W. Whieldon, Roy, WA (US); Joseph John Patrick Roberts, Clifton, VA (US); Christopher M. Berger, Lowell, MA (US); Gavin Timothy Plesko, Melrose, MA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 17/869,385

(22) Filed: Jul. 20, 2022

(65) Prior Publication Data
US 2024/0028185 A1    Jan. 25, 2024

(51) Int. Cl.
*G06F 3/048* (2013.01)
*G06F 3/04842* (2022.01)
*G06F 3/04845* (2022.01)

(52) U.S. Cl.
CPC ...... *G06F 3/04845* (2013.01); *G06F 3/04842* (2013.01)

(58) Field of Classification Search
CPC .................. G06F 3/04845; G06F 3/04842
See application file for complete search history.

(56) References Cited

U.S. PATENT DOCUMENTS

2019/0265870 A1*  8/2019  Sheth ............... G06F 3/0484
2020/0319780 A1* 10/2020  Klump ............. G06F 3/04845

* cited by examiner

Primary Examiner — Mahelet Shiberou
(74) Attorney, Agent, or Firm — Morrison & Foerster LLP

(57) ABSTRACT

Disclosed herein is a computer-implemented method comprising aggregating PFAS remediation evaluation data for a plurality of remediation options and for a plurality of predefined criteria; graphically displaying the user modifiable chart comprising the plurality of graphical representations of the aggregated PFAS remediation evaluation data, wherein: each graphical representation depicts data points visually plotted with weights, the plurality of graphical representations for the plurality of predefined criteria are visually ordered according to a rank of the plurality of predefined criteria, and the weights are based on the rank of the plurality of predefined criteria; detecting a first user input modifying the rank of at least one predefined criterion; in accordance with the first user input, automatically updating the weights of the data points; and displaying an updated user modifiable chart comprising the plurality of graphical representations of the aggregated PFAS remediation evaluation data.

24 Claims, 11 Drawing Sheets

PFAS REMEDIATION OPTION EXPLORER TOOL

FIELD OF THE DISCLOSURE

This disclosure relates generally to decision-making tools for comparing multiple options using multiple criteria, and more specifically to a PFAS remediation options explorer tool for comparing options for remediating PFAS contamination.

BACKGROUND OF THE DISCLOSURE

Different types of per- and polyfluoroalkyl substances (PFAS) are used to manufacture many nonstick and stain-repellent household products, and have been detected in drinking water in hundreds of locations around the United States and beyond. Exposure to these kinds of chemicals has been linked to harmful health effects. Additionally, because the molecules contain tough carbon-fluorine bonds, they persist once they leak into the environment and have a detrimental ecological impact. Recent efforts in water sampling and detection with sensors have been conducted to begin to understand the existence of PFAS contamination in water. However, due to technological and financial barriers, water infrastructure stakeholders, such as water treatment facilities and facilities that can be identified as sources of PFAS (i.e., paper mills and metal plating plants, to name a few) persistently struggle to effectively remediate PFAS. Additionally, different types of PFAS chemicals may require different remediation strategies, thus making it difficult for stakeholders to determine an effective treatment regimen for their facility and/or situation.

Limited capabilities exist for these stakeholders to aid in understanding how best to remediate areas contaminated with PFAS. Users may employ visualizations in the form of comparison tables or stoplight charts to analyze different remediation products and potential solutions. However, comparison tables tend to de-contextualize information, and tend to be static, non-customizable, lengthy, unwieldy, and require verbal rather than non-verbal cognitive resources. General recommender systems allow a user to provide inputs to customize recommendations. However, recommender systems lack interpretability and poorly explain the decision maker's results, provide only a single "optimal" result, and rely on a set of assumptions that may not always apply.

The landscape surrounding a decision maker's ability to select a viable option to remediate PFAS is quickly becoming more crowded with evolving technological, regulatory, health, economic, security, and environmental factors, thus making it difficult to forge a clear path in remediating and preventing further PFAS contamination. Therefore, there is a need for a remediation option comparison and visualization tool to support parallel comparison of multiple competing remediation options over multiple criteria to increase users' awareness of different remediation technologies/products and their potential outcomes.

SUMMARY OF THE DISCLOSURE

The disclosed PFAS remediation explorer tool may be used as a guide by treatment plant operators to compare PFAS remediation options and identify one or more options that are a good fit for their facility and/or situation. Additionally, the remediation explorer may be utilized by one or more of the public, policymakers, and/or other water infrastructure stakeholders to better understand the evolving landscape of PFAS remediation technologies. The tool may utilize information from different data sources to form a display of potential remediation options and criteria which dynamically adjusts based on, for example, the importance and satisfaction thresholds of each criteria as selected by a decision maker. Additionally, the remediation explorer may display a suggested set of remediation options based on an input from a user, which may include types and/or amounts of PFAS present in the user's facility. Using the PFAS remediation explorer tool, the user can compare tradeoffs across multiple remediation options, over multiple criteria, each in parallel.

In some embodiments, a computer-implemented method for displaying a user modifiable chart comprising a plurality of graphical representations of aggregated PFAS remediation evaluation data is provided, the method comprising: aggregating PFAS remediation evaluation data for a plurality of remediation options and for a plurality of predefined criteria; graphically displaying the user modifiable chart comprising the plurality of graphical representations of the aggregated PFAS remediation evaluation data, wherein: each graphical representation depicts data points visually plotted with weights, the plurality of graphical representations for the plurality of predefined criteria are visually ordered according to a rank of the plurality of predefined criteria, and the weights are based on the rank of the plurality of predefined criteria; detecting a first user input modifying the rank of at least one predefined criterion; in accordance with the first user input, automatically updating the weights of the data points; and displaying an updated user modifiable chart comprising the plurality of graphical representations of the aggregated PFAS remediation evaluation data.

In some embodiments, the method includes, in accordance with the first user input, automatically updating the visual order of the plurality of graphical representations for the plurality of predefined criteria.

In some embodiments, the method includes displaying the updated user modifiable chart comprising the updated visual order of the plurality of graphical representations for the plurality of predefined criteria.

In some embodiments, each graphical representation for the plurality of predefined criteria comprises a user modifiable satisfaction threshold.

In some embodiments, the user modifiable satisfaction thresholds distinguish between more desirable and less desirable plotted data points.

In some embodiments, the method includes detecting a second user input modifying the satisfaction threshold of at least one graphical representation.

In some embodiments, the method includes, in accordance with the second user input, automatically updating a location of a marker and a colored shading on the plurality of graphical representations.

In some embodiments, the method includes displaying the updated user modifiable chart comprising the updated marker and the updated colored shading on the plurality of graphical representations.

In some embodiments, the colored shading in a first direction from the marker is a first color, and the colored shading in a second direction from the marker is a second color.

In some embodiments, the plurality of remediation options includes conventional technologies, emerging technologies, adsorption, oxidation, incineration, and membrane filtration.

In some embodiments, the plurality of predefined criteria for evaluating the remediation options includes efficacy, maturity, waste, cost, and volume.

In some embodiments, each graphical representation depicts the data points in one or more frequency distributions on a vertical axis.

In some embodiments, a data point represents an individual PFAS remediation outcome contributing to one or more remediation options being evaluated.

In some embodiments, a location of the data point on a graphical representation of the aggregated data is based on performance of the PFAS remediation outcome.

In some embodiments, a first direction of the plurality of graphical representations depicts better performance, and a second direction of the plurality of graphical representations depicts worse performance.

In some embodiments, the performance is normalized for comparing the plurality of remediation options based the plurality of predefined criteria.

In some embodiments, a first graphical representation of the aggregated PFAS remediation evaluation data comprises a first set of data points in a first category of remediation options.

In some embodiments, a second graphical representation of the aggregated PFAS remediation evaluation data comprises a second set of data points evaluated based on a first predefined criterion.

In some embodiments, a portion of the second set of data points overlaps with the first set of data points.

In some embodiments, a format of the plurality of graphical representations is interchangeable between frequency distributions and individual data points based on user selection.

In some embodiments, the method includes detecting a third user input selecting a button on the display for changing the displayed user modifiable chart.

In some embodiments, the method includes, in accordance with the third user input, displaying a bubble chart comparing the plurality of remediation options based on two evaluation criteria of the plurality of evaluation criteria.

In some embodiments, each of the two evaluation criteria are interchangeable for a different evaluation criterion of the plurality of evaluation criteria.

In some embodiments, a system for displaying a user modifiable chart comprising a plurality of graphical representations of aggregated PFAS remediation evaluation data is provided, the system comprising: a display; and one or more processors configured to cause the system to: aggregate PFAS remediation evaluation data for a plurality of remediation options and for a plurality of predefined criteria; graphically display the user modifiable chart comprising the plurality of graphical representations of the aggregated PFAS remediation evaluation data, wherein: each graphical representation depicts data points visually plotted with weights, the plurality of graphical representations for the plurality of predefined criteria are visually ordered according to a rank of the plurality of predefined criteria, and the weights are based on the rank of the plurality of predefined criteria; detect a first user input modifying the rank of at least one predefined criterion; in accordance with the first user input, automatically update the weights of the data points; and display an updated user modifiable chart comprising the plurality of graphical representations of the aggregated PFAS remediation evaluation data.

In some embodiments, a non-transitory computer-readable storage medium storing instructions for displaying a user modifiable chart comprising a plurality of graphical representations of aggregated PFAS remediation evaluation data is provided, the instructions executable by a system, the system comprising a display and one or more processors, wherein execution of the instructions by the system causes the system to: aggregate PFAS remediation evaluation data for a plurality of remediation options and for a plurality of predefined criteria; graphically display the user modifiable chart comprising the plurality of graphical representations of the aggregated PFAS remediation evaluation data, wherein: each graphical representation depicts data points visually plotted with weights, the plurality of graphical representations for the plurality of predefined criteria are visually ordered according to a rank of the plurality of predefined criteria, and the weights are based on the rank of the plurality of predefined criteria; detect a first user input modifying the rank of at least one predefined criterion; in accordance with the first user input, automatically update the weights of the data points; and display an updated user modifiable chart comprising the plurality of graphical representations of the aggregated PFAS remediation evaluation data.

BRIEF DESCRIPTION OF FIGURES

The invention will now be described, by way of example only, with reference to the accompanying drawings, in which.

DETAILED DESCRIPTION OF THE DISCLOSURE

Figure 1A:
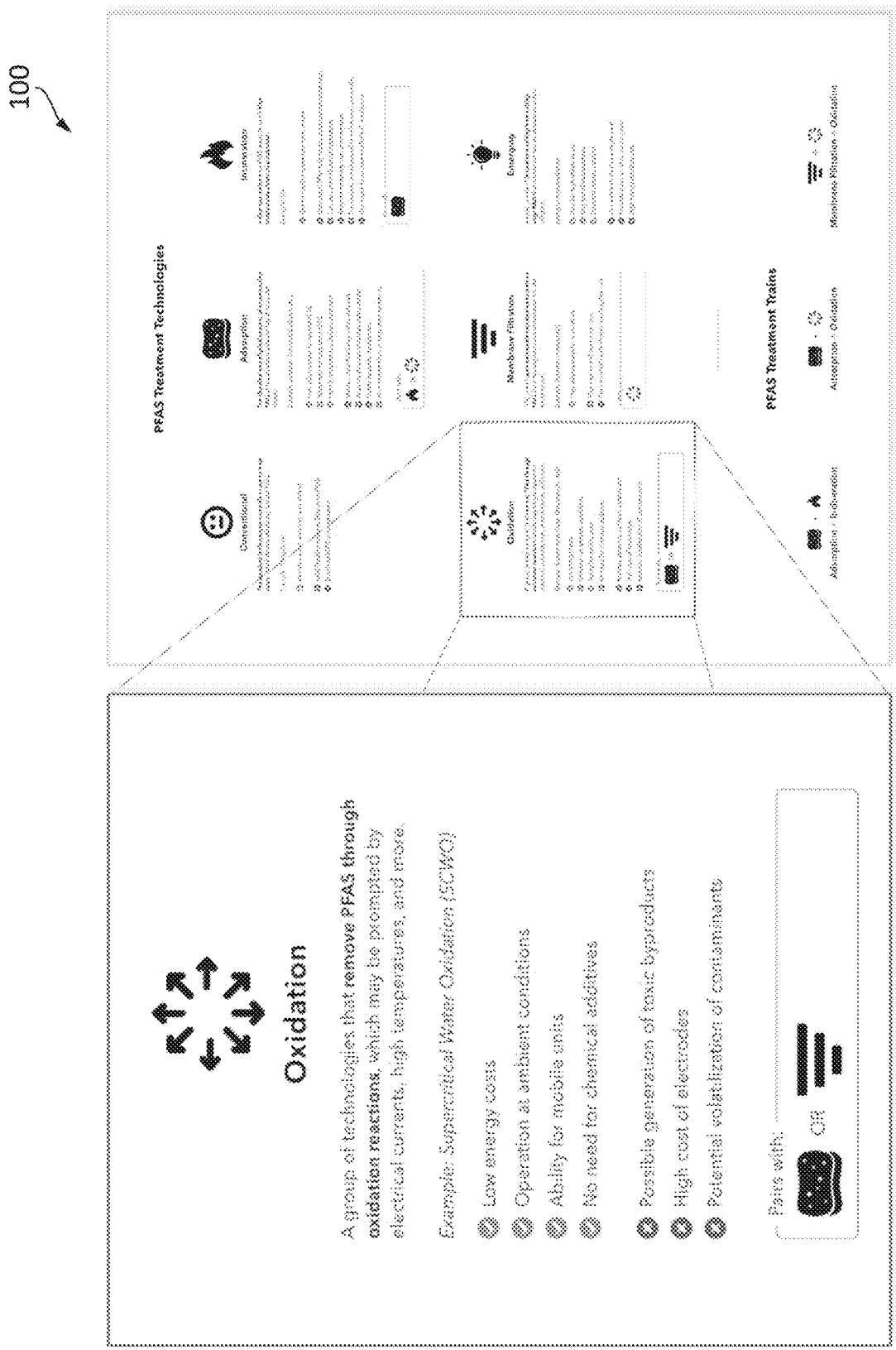
FIGS. 1A-1B illustrate introductory user interfaces of a PFAS remediation explorer tool, in accordance with some embodiments.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

The disclosed PFAS remediation explorer tool provides an interactive way for stakeholders to compare tradeoffs between many remediation options in parallel according to a set of evaluation criteria. The explorer links options and evaluation criteria in the display, allows for customization of criteria importance and satisfactory performance, includes frequency distributions to display ranges and clusters of outcomes (rather than oversimplified point estimates), and exposes individual data points to support intuitive and relatable case-based understanding. Additionally, the tool may include an alternate display for deciding between remediation options, such as a bubble chart. The user may be able to input details related to their intended use of a potential remediation solution, such as PFAS levels and type, to identify relevant options. Water infrastructure stakeholders may implement the tool to upgrade PFAS detection technology or to understand market-level trends (i.e., as a technology tracker system), for example.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The present disclosure in some embodiments relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

FIG. 1A illustrates an initial user interface 100 of the PFAS remediation explorer tool, in accordance with some embodiments. The PFAS remediation explorer tool may initially educate the user on what PFAS chemicals are and why they should be remediated, and provide one or more intended uses for the tool. In an initial display of the tool, a user may be introduced to a plurality of potential treatment technology categories for remediating PFAS. In FIG. 1A, an example treatment technology category, oxidation, is expanded for demonstration purposes. Treatment technology categories may include, for example, adsorption, incineration, oxidation, membrane filtration, conventional technologies, and emerging technologies. The initial display 100 may additionally include one or more PFAS treatment trains, which suggest two or more treatment categories that may be grouped together to effectively remediate PFAS contamination. The treatment categories and/or treatment trains may be updated at any time to remain consistent with updated data integrated to the tool. As illustrated in the expanded view related to oxidation, each category may be described by one or more of category icons, names, definitions, examples, benefits and drawbacks, and related categories. Each of the categories will be described in greater detail below.

Conventional technologies may include standard technologies that are currently being used to treat water, and are generally known to be ineffective in remediating PFAS contamination. For example, coagulation may be a conventional treatment technology. Another technology category may be adsorption, which is the chemical and physical process of accumulating PFAS at the interface between liquid and solid phases. An example of adsorption includes granular activated carbon (GAC), and the interface 100 may suggest combining adsorption with one or more of incineration or oxidation for a more effective treatment plan. Incineration may be a method to dispose PFAS by applying a high temperature to cause chemical breakdown. The oxidation category may include technologies which remove PFAS through oxidation reactions, which may be prompted via electrical currents and high temperatures, for example. An example of an oxidation technology includes supercritical water oxidation (SCWO). Aside from adsorption, interface 100 may suggest pairing oxidation treatment with membrane filtration technologies. Membrane filtration is defined as using semi-permeable membranes to remove PFAS from flowing water and concentrating it in the waste stream. An example of membrane filtration is reverse osmosis (RO). Finally, emerging treatment technologies may include a wide variety of innovations that arise from cutting edge research and development projects that may not be proven at scale or widely adopted.

To analyze each remediation option according to a plurality of criteria, the tool may rely on a plurality of data sources which provide additional information about each of the technologies mentioned above. For example, data sources analyzed to provide decision support may include journals such as Remediation, Environmental Science and Technology, Ultrasonics Sonochemistry, Water Research, AWWA Water Science, Process Safety and Environmental Protection, and ACS Sustainable Chemistry and Engineering.

Each study from the plurality of data sources may identify one or more remediation products, options, and/or outcomes. The identified products may be assigned a technology category described above, and if applicable, a sub-category. Information related to a given study may be attributed to the given product/option it details and may contribute to determining the performance of the option in the analysis. Information may include citation, type of study, PFAS levels reported in the study, type of PFAS present (i.e., short or long chain), key water properties (i.e., pH, dissolved organics), and study conditions (i.e., experiment scale and/or scalability). In some embodiments, the information gathered from each study may be analyzed to evaluate the identified one or more products based on a plurality of evaluation criteria. Evaluation criteria used to assess each remediation product may include efficacy, waste, cost, volume, and maturity. For example, efficacy of a given remediation product may be evaluated by assessing the reported overall removal yield, the removal yield for short chain PFAS, the removal yield for long chain PFAS, and the removal efficiency. Waste may be evaluated by assessing the reported amount of by-products and the waste generation in the gathered data. The data sources and/or individual studies implemented to the remediation explorer tool may be updated over time to remain in accordance with studies as the research field surrounding PFAS evolves.

Figure 1B:
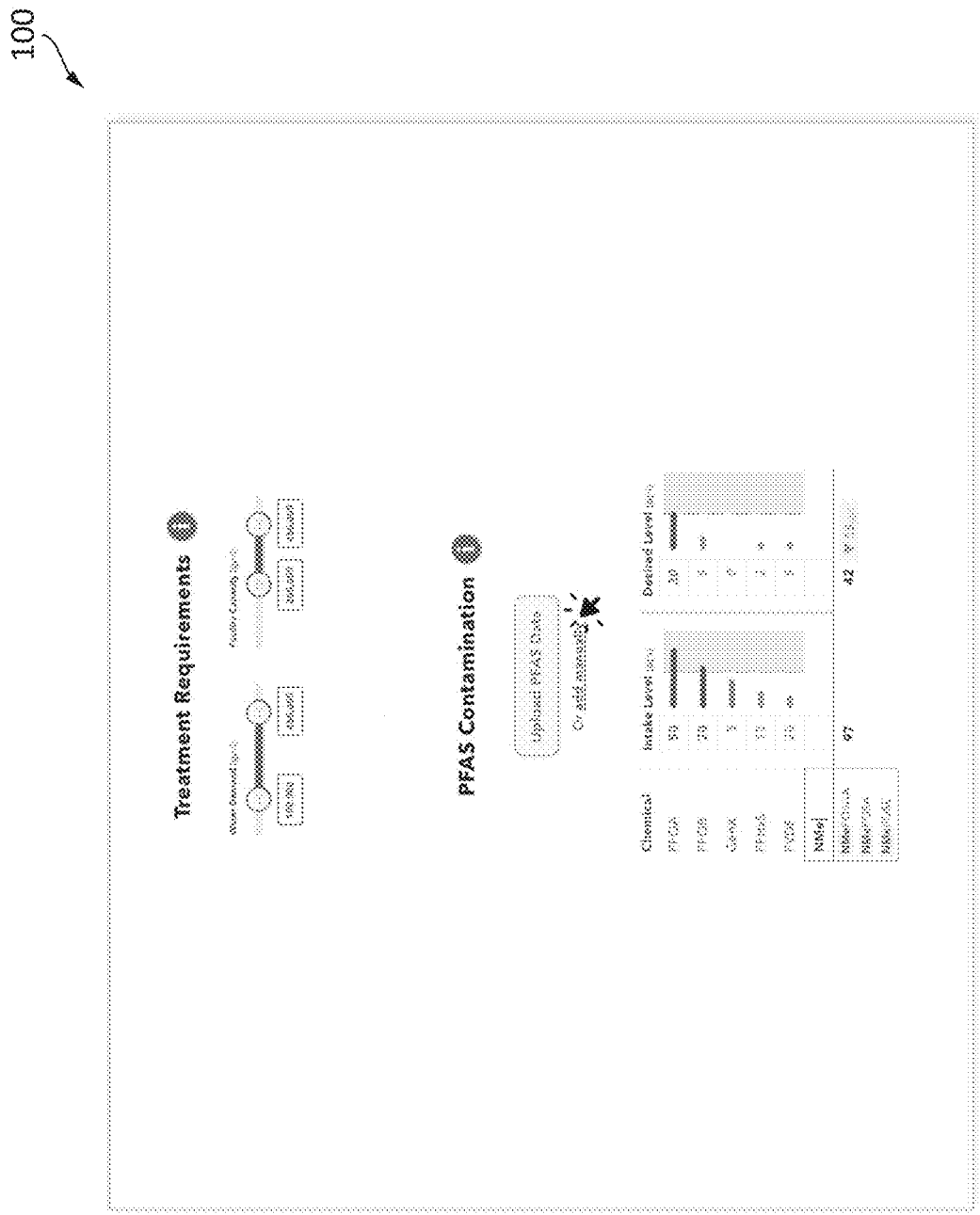

With reference to FIG. 1B, a user may provide one or more data inputs to interface 100 in the remediation explorer tool to guide analysis. For example, a user may provide one or more treatment requirements to meet their needs, such as water demand and facility capacity. Each of the water demand and facility capacity may be inputted as a single value or in an adjustable range. For example, the user may provide a minimum and a maximum water demand and/or facility capacity. As shown in FIG. 1B, the user may additionally provide PFAS contamination data to the remediation explorer tool. The user may upload PFAS data from an external source, or manually input data. For example, the user may manually input one or more PFAS chemical names, current PFAS intake levels, and desired PFAS levels.

FIGS. 2A-2F illustrate user interface 200 of a PFAS remediation explorer tool for depicting one or more suitable options from a plurality of remediation options using multiple evaluation criteria, which will be described in greater detail below. Shown in FIG. 2A, the data aggregated in the visualization tool may be based on a plurality of predefined remediation options, illustrated by an icon and/or abbreviation in FIGS. 2A-2F and described in greater detail above. Each option may correspond with a technology category described above. Additionally, each option may be depicted by a graphical representation 202 in the display. Furthermore, data used in the remediation option explorer tool may be aggregated by a plurality of predefined evaluation criteria used to analyze each outcome contributing to an option (e.g., a product in a given technology category). Each evaluation criteria may be represented by a graphical representation 204 in user interface 200. The evaluation criteria may distinguish different characteristics of remediation options, and include, as described briefly above, efficacy, volume, waste, maturity, and cost. The predefined option and evaluation criteria displayed may be customized for individual use of the remediation explorer tool.

Each of the remediation option graphs 202 and criterion graphs 204 may include a plurality of individual products, or outcomes, represented by distributions. The distributions may be aggregated according to remediation option, or technology category (e.g., distributions 108), and criteria (e.g., distributions 206). Thus, distributions 206 may represent substantially the same set of data as distributions 208, but are grouped in a different manner. The system may analyze case-based data related to individual products/outcomes to generate the plurality of distributions.

The remediation options may be illustrated in parallel in the form of option graphical representations 202, such as layered density plots, as shown in the left data pane of user interface 200. Each plot may comprise a vertical or horizontal axis with a layered set of distributions 208 which correlates with the distributions 206 of the criteria graphical representations 204. For example, as shown in FIG. 2A, each of the distribution 206 for the technology category of absorption related to efficacy, volume, waste, maturity, and cost in the right data pane may contribute to the layered distributions 208 on the option graph 202 of adsorption, shown in the left data pane.

In some embodiments, user interface 200 may include scale 210 for illustrating a rank of the evaluation criteria. The criteria may be manually ranked by the decision maker relative to one another according to their importance as perceived by the decision maker. In some embodiments, the evaluation criteria may be ranked according to a different attribute, such as the priorities of relevant stakeholders, and the decision maker may modify the attribute during use of the remediation explorer. The criteria may be visually ordered by decreasing importance from left-to-right or top-to-bottom on the user interface 200, for example. Ranking the set of evaluation criteria will be described in greater detail below with respect to FIG. 2D. Based on the assigned rank and/or importance value, the visual weight applied to the individual data points making up the distributions in the right and left data pane may automatically scale in proportion to the criterion's importance (as opposed to considering all criteria equally). The scaling may affect the kurtosis (i.e., height) of the distributions 206 and 208 (as opposed to the distribution base, such as to not misrepresent the data).

Figure 2A:
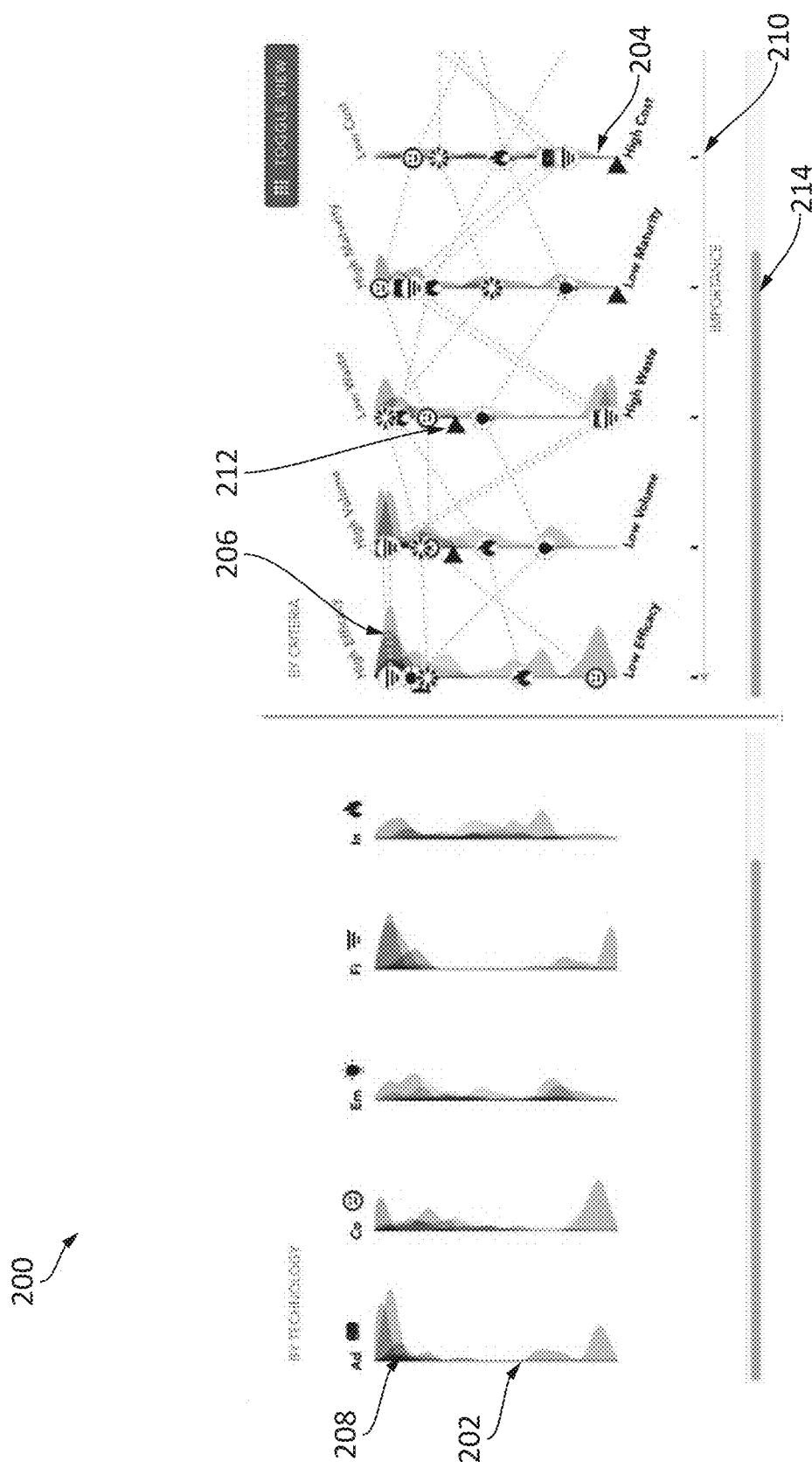
FIGS. 2A-2F illustrate user interfaces of a PFAS remediation explorer tool for comparing remediation options across a plurality of criteria, in accordance with some embodiments.

In the right data pane of user interface 200 in FIG. 2A, the user may visualize how each remediation option performs according to the desired evaluation criteria. The individual performance of each data point (e.g., a product related to a given technology option) may be represented in a graph, such as a parallel density plot, wherein each distribution 206 is made up of one or more data points describing the distribution of historical or potential future outcomes related to a single criterion and is layered on a vertical or horizontal axis. For example, the performance of adsorption, conventional solutions, emerging solutions, membrane filtration, and incineration as it relates to the criterion efficacy are illustrated on a graph 204 corresponding to efficacy. Each distribution 206 may be distinguished with a label or icon depicting the correlating remediation option, which will be elaborated upon in greater detail below. The distributions 206 and 208 are frequency distributions demonstrated as density plots on the technology graph 202 and criteria graph 204, rather than point estimates of a single value or probability, which oversimplify the data by obscuring the diversity of potential outcomes. Each set of distributions may have one or more modes, illustrating a higher frequency of data points at a given location on the axis of graphical representations 202 and 204. The use of frequency distributions (rather than point estimates) may allow the user to view one or more clusters of outcomes (e.g., products), and may cue the user investigate what causes different remediation options to perform differently under different circumstances.

In some embodiments, one or more distributions may visually overlap on an axis. The distributions 206 and 208 may be differentiated in the graphs by defining the boundaries of each distribution. Each distribution may be shaded, as will be described in greater detail below. In the instance two or more distributions overlap on an axis, partial transparency at the overlap may reveal the portion of overlap between the two or more distributions.

The PFAS remediation explorer tool may illustrate options on a generic scale of, for example, good and bad, better and worse, or more desirable and less desirable criteria values, as opposed to absolute units. The customizable threshold for satisfactory and unsatisfactory values is described in greater detail below. For example, one direction (e.g., the top end or left end) of the graphical representations 202 and 204 for each remediation option and evaluation criterion may designate more desirable outcomes, and the opposite direction (e.g., the bottom end or left end) of the graphical representations 202 and 204 may designate less desirable outcomes. For example, for the criterion volume, one end of the axis may correlate with high volume (e.g., good, more desirable), and the opposing end of the axis may correlate with low volume (e.g., bad, less desirable). The inputted data may be normalized to equate with this scale, making the different criteria commensurate in scale, and allowing the decision maker to easily compare between different evaluation criteria. For example, all analyses of individual products/options may be normalized to a scale of 1 to −1, or 0 to 1.

In some embodiments, a decision maker may desire to remove one or more options and/or evaluation criteria completely from the PFAS remediation explorer tool. The decision maker may select the one or more remediation options they wish to remove from the visualization tool in a separate data pane (not illustrated) which lists each category. In some embodiments, a user may select one or more option graphs 202 and remove the graph from the display by selecting a button on the display. Likewise, in some embodiments, a user may desire to remove one or more criteria from analysis, and may do so in a similar fashion as described with respect to categories and option graphs 202. By removing one or more undesirable remediation options, the user interface 200 may be decluttered and easier examination of the remaining options may be promoted.

Each evaluation criteria graph 204 may comprise a moveable marker 212 to indicate a satisfaction threshold. Marker 212 may be, for example, a triangle, rectangle, circle, or line on an axis of the graph. The threshold may be initially set (e.g., by default in the system) to the median of the input data for each criteria, such that 50% of the outcomes are above the threshold, and 50% are below. As will be described in greater detail with respect to FIG. 2E, the threshold of satisfaction may be modified by the user in analyzing options across evaluation criteria.

Shown in FIG. 2A, the remediation explorer tool may by default automatically sort the remediation options in the left data pane of the interface 200 according to robustness. For example, option graphs 202 for each remediation technology category may be ordered by decreasing robustness from left-to-right, top-to-bottom, etc. How robust an option is may be based at least on the range of possible outcomes that the option turns out satisfactorily (i.e., acceptably) for. For example, the adsorption category in FIG. 2A is more robust than the others displayed at least because outcomes which make up the adsorption category perform satisfactorily for the largest range of evaluation criteria, especially those evaluation criteria which are ranked most important. Therefore, one may conclude adsorption is a more suitable remediation option compared at least to conventional solutions and emerging solutions based on the evaluation criteria provided in the right data pane. The robustness of a remediation option may be more valuable than optimality for a decision maker because the more optimal option may only be considered the "best" option under specific conditions, which may not always be guaranteed. By displaying more robust remediation options first, decision makers are instantly provided with the best options according to the default rank of evaluation criteria, thereby requiring minimum intervention and/or configuration by the decision maker to make a quick decision between options.

In some embodiments, a user may order option graphs 202 in any fashion described above with respect to criteria graphs 204 in FIG. 2A and FIG. 2D below. For example, a user may manually adjust the visual order of graphs 202 such that the options the decision maker is most interested in are viewed first. In some embodiments, the user may modify the order of graphs by selecting (i.e., clicking with a user input device, touching on a touch screen, etc.) one or more graphs 202, dragging the graph to a desired location, and dropping the graph. In some embodiments, a decision maker may modify the order of option graphs 202 by manually inputting the title of one or more options into interface 200 to indicate a desired order of graphs 202.

In some embodiments, the decision maker may desire a deeper investigation beyond observing remediation options according to robustness, and thus may observe criteria graphs 204. The visualization tool may initially automatically sort evaluation criteria graphs 204 in descending order (e.g., from left-to-right or top-to-bottom) by variance (i.e., influence) in the right pane of user interface 200. Evaluation criteria with the most variation may be understood to provide the most value in differentiating between options and thus are more influential to the decision maker than criteria which provide little or no variation between options. For example, as shown in FIG. 2A, the various remediation options are located along the broadest spectrum on the graph 204 associated with efficacy, thus the efficacy criterion is initially ranked before the other criteria. Thus, the performance of each remediation option with regards to the efficacy criterion may have the greatest weight to contribute to the distribution 206 and 208 associated with efficacy. In some embodiments, the user may manually order the evaluation criteria graphs 204 as described above with respect to option graphs 202. For example, the user may order the criteria graphs 204 with respect to a user-perceived importance of each criteria. In the instance where many remediation options and criteria are being considered with the visualization tool, the decision maker may utilize scroll bars 214 on interface 200 to view less robust options and criteria with less variability. Scroll bars 214 may be located along a side of each data pane, such as the top, bottom, middle, left, or right.

Figure 2B:
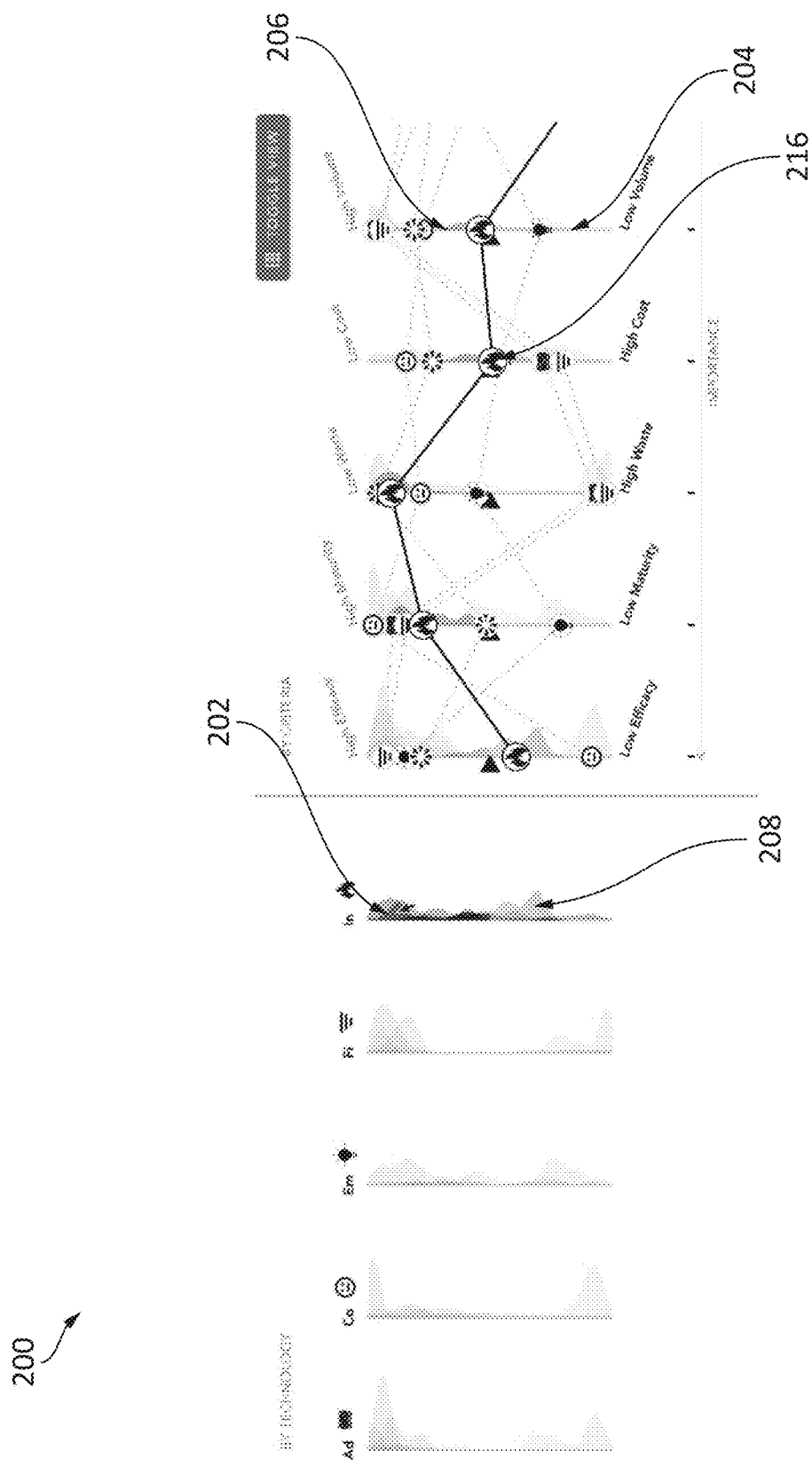
Figure 2C:
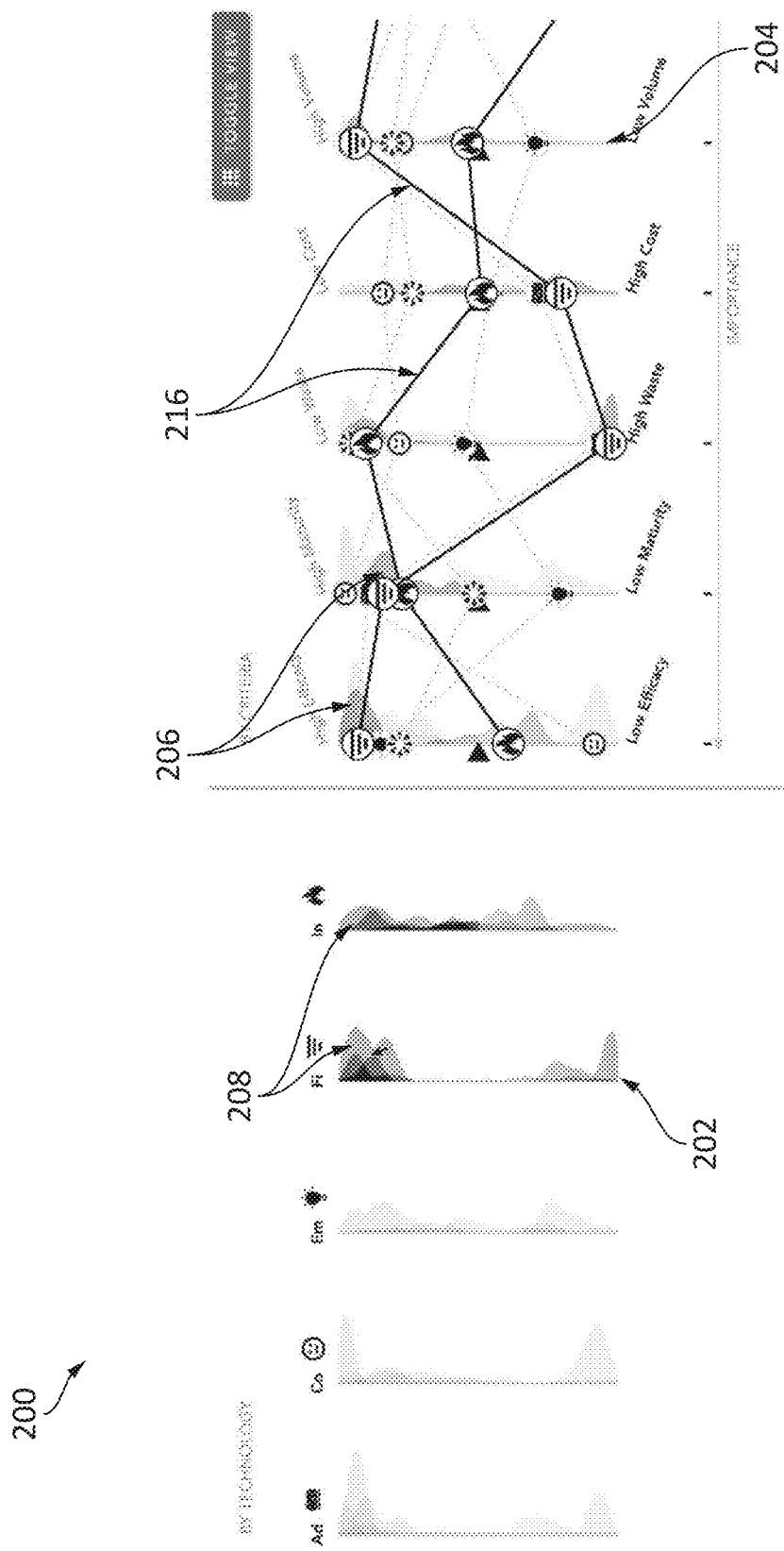

With reference to FIGS. 2B-2C, a decision maker may select one or more option graphs 202 in the left data pane, and the graph as well as the corresponding selection may be visually highlighted in real-time across criteria graphs 204 in the right data pane. For example, a user may click on, touch, or hover a cursor on the display over any one or more features of the corresponding option graph 202 to highlight one or more features. In some embodiments, the user may manually input the desired options to interface 200, or select one or more options to highlight from a list on the interface. In some embodiments, the remaining non-selected graphs 202 and distributions 206 on criteria graphs 204 may be dimmed, such as to recede them from the user's view, but not completely remove them from sight. For example, the coloring of each non-selected technology graph 202 and/or unrelated distributions 206 may be dimmed in comparison to the selected graphs and related distributions.

Likewise, a decision maker may select one or more criteria graphs 204 in the right data pane, and the corresponding distributions 208 in the left data pane on technology graphs 202 may be visually highlighted. The non-selected distributions 208 and/or criteria graphs 204 may be receded from the user's view, such as by automatically dimming the graphs/distributions.

As shown in FIG. 2B, the decision maker may select (i.e., via one or more methods described above) the graph 202 of the incineration category on the interface 200, and each of the corresponding distributions 206 in the criteria graphs 204 may be highlighted in real-time in the right data pane. Likewise, in FIG. 2C, the decision maker may select one or more option graphs 202, such as the graphs associated with membrane filtration and incineration as shown, and the corresponding distributions in the right data pane for both options may be instantly highlighted. In each of FIGS. 2B and 2C, the unselected distributions 206 and option graphical representations 202 may be recessed from the user's view.

In some embodiments, each distribution 206 across the criteria graphs 204 is identified with an icon 216 for the corresponding remediation option. The icon may be positioned at the median of the outcomes (e.g., products) contributing to a given distribution, and each icon 216 for a given option may be visually connected across the criteria graphs 204. For example, similar to a parallel coordinates or parallel categories plot, icons 216 may be connected via one or more lines between graphs 204. The lines may be solid, dashed, broken lines, etc. In relation to the selected one or more option graphs 202, the icons 216 corresponding to the highlighted distributions 206 may additionally be accentuated in comparison to the remaining icons in the right data pane, as shown. In some embodiments, the lines connecting each highlighted distribution 206 across different graphs 204 may be bolded and intensified in color to a dark color upon selecting a corresponding distribution. Accentuating the lines and/or icons 216 associated with one or more selected remediation options 202 may enable a simple visual comparison between types of remediation options for the decision maker. In some embodiments, by selecting the two or more technology options, a user may evaluate the selected options as a treatment train (as described above with respect to FIG. 1A).

In some embodiments, in moving a pointer (e.g., with a mouse) over option graphs 202 or criteria graphs 204, the decision maker may also visualize a tooltip, which may provide information related to the corresponding criteria for that remediation option. A user may view a tooltip by, for example, by clicking on and/or hovering a cursor over a desired graph. The tooltip may detail the number of individual products/outcomes grouped within the corresponding remediation option, an explanation of the option, etc. In some embodiments, the user may click on or hover over a given distribution in a graphical representation 202 or 124, and data related to the given distribution may be presented on the interface 200. For example, a user may view information such as the number of products/outcomes contributing to the distribution, the normalized average for the performance of the cluster of outcomes, a textual summary of the distribution of products, etc. In some embodiments, a user may initially click a first distribution on a graph 202 and/or 204 and may then scroll or click again (i.e., right click or left click on a user input device, such as a mouse) to view information related to subsequent distributions 206, 208 on the graph. For example, as described above, one or more distributions on a given axis of a graph 202 and/or 204 may be layered such that a second distribution is at least partially hidden behind a first distribution. Thus, by selecting a first distribution on a given graph, the user may easily toggle between viewing information for each subsequent distribution on a tooltip. In some embodiments, contextual information related to a given remediation option and/or distribution may additionally or alternatively be viewed in a separate window/data pane of the interface.

Figure 2D:
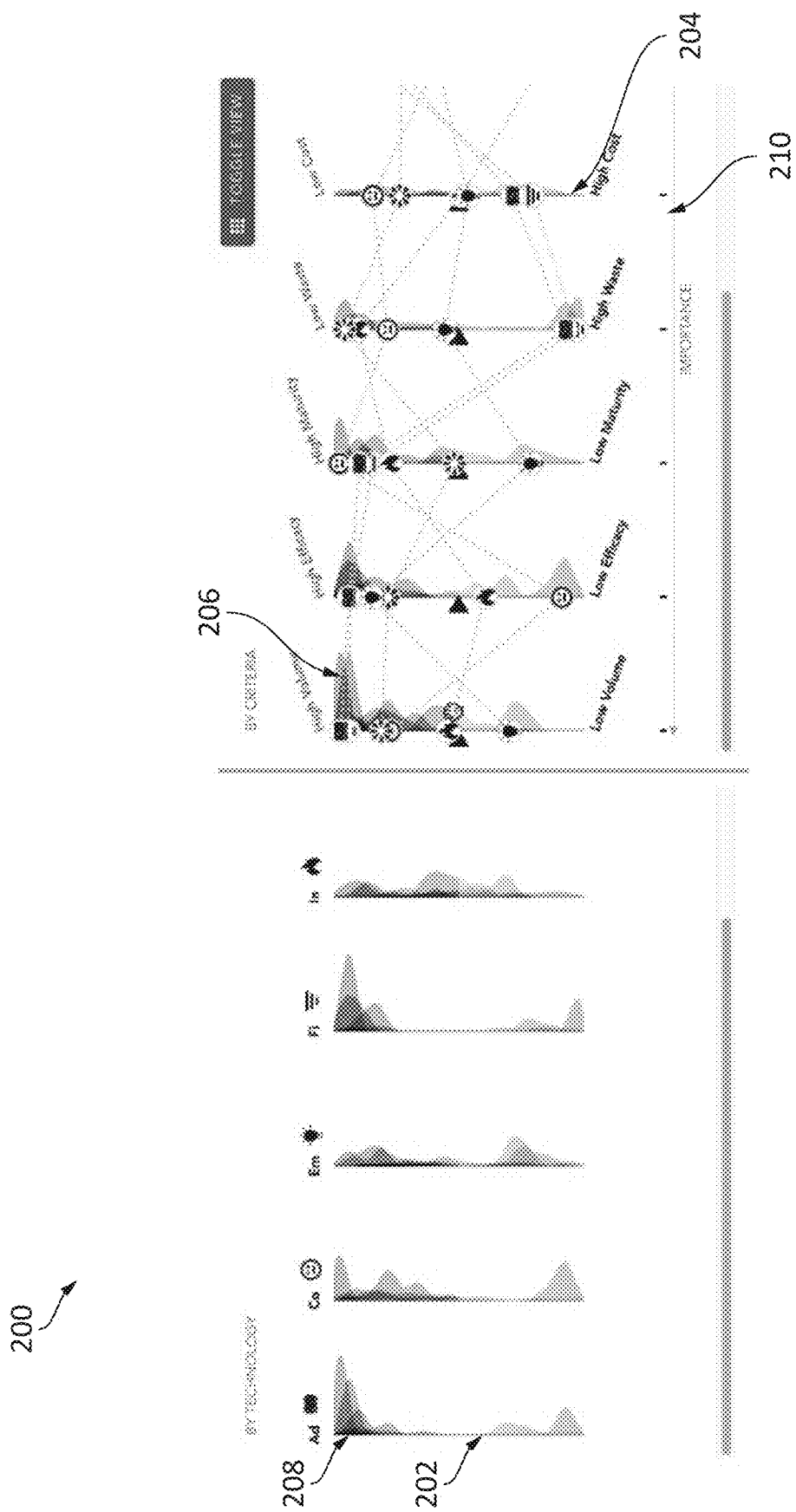

FIG. 2D illustrates an alternate order of evaluation criteria graphs 204 in comparison to FIGS. 2B-2C, wherein volume is sorted as more important than the remaining criteria, and was previously sorted after the other criteria. In some embodiments, a user may change the rank of evaluation criteria in the right data pane by selecting one or more criteria graphs 204 and moving it to a different location along the importance scale 210. For example, the user may click on a feature of one or more graphs 204, drag the one or more graphs 204 to a new location in the rank of criteria, and drop the one or more locations in the rank. Graphs 204 may be visually ordered from left-to-right or top-to-bottom by decreasing user-perceived importance. In some embodiments, the user may manually enter a desired rank of one or more criteria to the user interface 200, and the position of the one or more criteria on the user interface may update accordingly. For example, in the instance 5 evaluation criteria exist in the PFAS remediation explorer tool, the user may manually assign each criteria a rank from 1-5, wherein each ranking is applied to a single criteria. In some embodiments, the decision maker may input a nominal value indicative of the importance (or other attribute used to visually order the criteria), the nominal value corresponding to a value on the scale. For example, in the instance 5 evaluation criteria exist in the model, there may exist 10 possible importance values on a scale, wherein each of the 5 criteria are assigned a value 1-10. The position of one or more graphs 204 in the user interface 200 may update accordingly based on the newly assigned importance values.

With reference to FIG. 2D, by modifying the rank of the criteria graphs 204, including increasing the importance of the criteria volume as shown, the visual weights of the distributions 206 and 208 associated with the criterion volume may proportionally adjust (i.e., increase) automatically. Likewise, the visual weight applied to the distributions associated with the remaining criteria (whose rank were lowered) may automatically decrease. As shown, by modifying the importance of evaluation criteria, a better option may be presented in the left data pane due to the contribution of the visual weights. For example, the decision maker may conclude that in accordance with at least the selected rank of criteria and their respective thresholds of satisfaction, membrane filtration technologies may be a more suitable remediation option than the remaining options by visualizing the distributions 206 and/or 208.

Figure 2E:
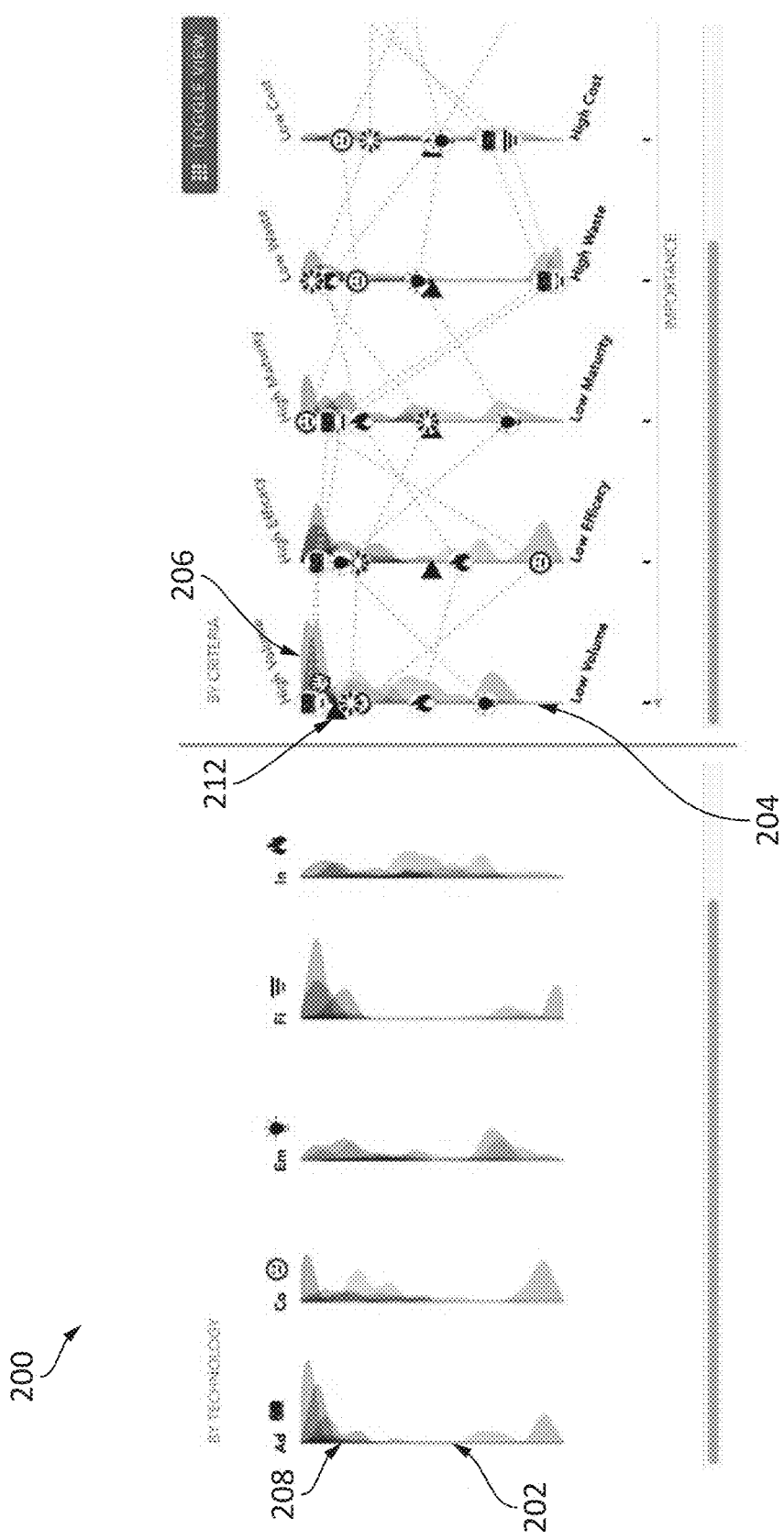
Figure 2F:
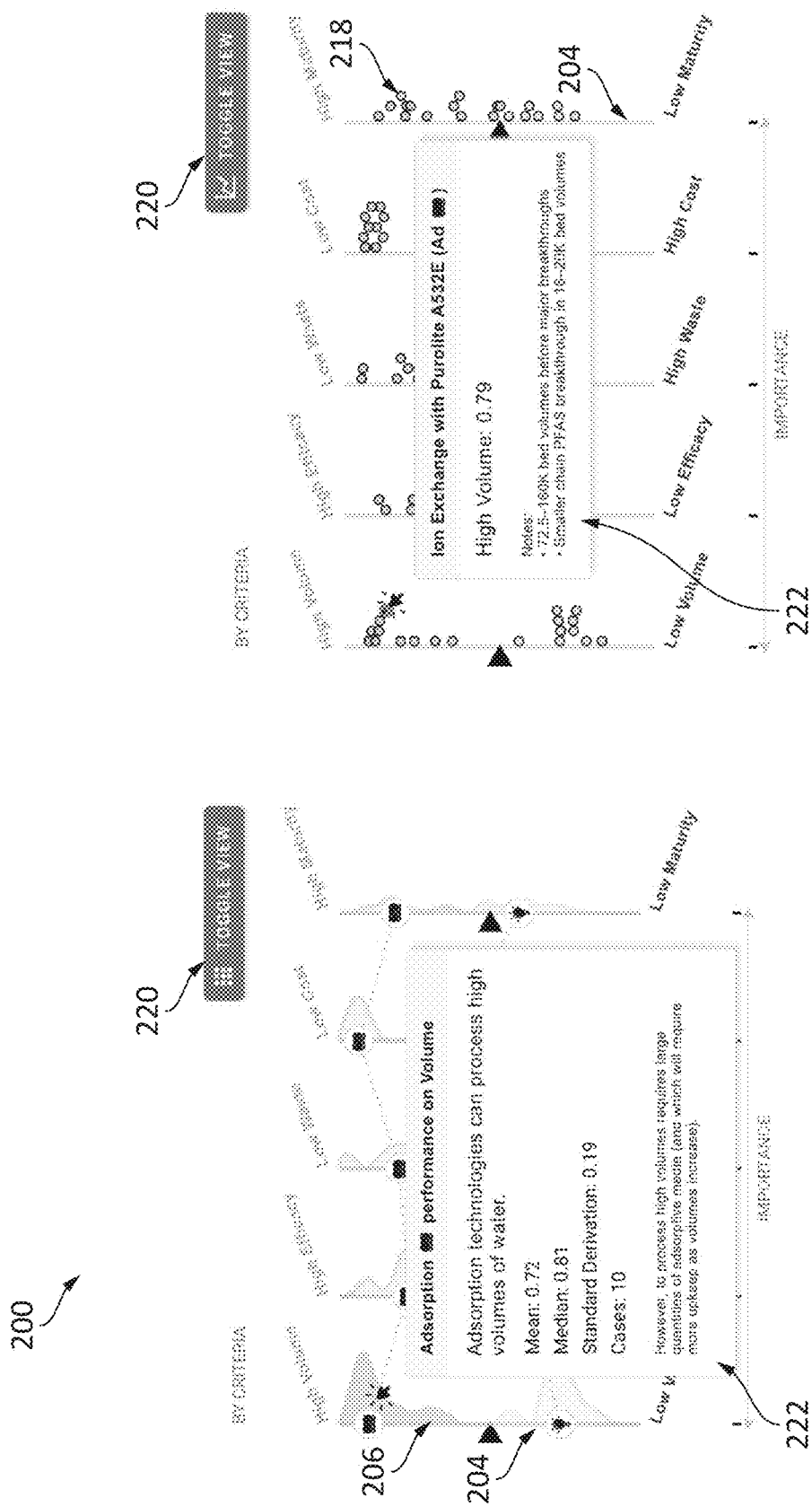

As shown in FIG. 2E, the user may customize the perceived threshold of satisfaction using marker 212 on each graph 204 based on their preferences and/or needs. For example, a decision maker may desire to consider only options that can accompany high volume water with PFAS contamination. Thus, the decision maker requires a small threshold of satisfaction on the graph 204 for volume, and the decision maker may move marker 212 in one direction (e.g., up) along the axis of graph 204. In another example, if any amount of waste is acceptable to a decision maker, the decision maker may move marker 212 on the axis of criteria graph 202 associated with waste in a different direction (e.g, down) along the axis, thus depicting all distributions 206 on the waste axis as acceptable. In some embodiments, the user may manually input a normalized value (e.g., between 0 and 1, or −1 and 1) corresponding to a position on the axis, and the position of marker 212 on the axis may update accordingly. For example, the user may input "0," and the marker location may update to the middle of a given axis.

In some embodiments, an acceptable outcome (i.e., in one direction from marker 212) may be indicated by a first color of shading (e.g., green) on the criteria graphs 204, and an unacceptable outcome (i.e., in the opposing direction from marker 212) may be indicated by a second color of shading (e.g., red) on the criteria graphs 204. Other combinations of colors and/or patterns may be employed to differentiate between perceived satisfactory and unsatisfactory outcomes contributing to distributions 206 and 208. In some embodiments, when a user modifies the position of marker 212 on one or more graphical representations 204 via one or more methods described above, the shading of distributions 206 and 208 may update accordingly. The pattern of shading from graphs 204 may directly translate to that illustrated on option graphs 202, despite option graphs 202 not comprising marker 212, in some embodiments.

In some embodiments, a decision maker may be interested in one or more individual products which contributes to a given distribution 206 and/or 208. The explorer may allow a user to toggle between viewing the data as high-level densities, as shown on the left in FIG. 2F, or as low-level data points 218, as shown on the right in FIG. 2F, using a button 220. The user may toggle between visualization settings by, for example, clicking more than once on a given graph (i.e., double clicking with a user input device). For example, data may be illustrated in the form of beeswarm, packed circle, and/or jitter plots.

In some embodiments, data points may represent historical case-based data, potential future outcomes, and/or individual products that contribute to each option being evaluated. For example, an individual outcome related to the adsorption category of remediation options may be ion exchange with Purolite A532E.

Using a data point framing, a decision maker may analyze individual products and/or outcomes which make up a given distribution. In some embodiments, by selecting a data point on the beeswarm plot, the explorer may display a tooltip 222, which provides additional information on the selected case. For example, tooltip 222 may comprise information such as the number of individual products/outcomes represented by the distribution and the normalized mean, median, and standard deviation of the performance of the cluster of outcomes. In some embodiments, in the instance more than one mode exists in a given distribution, a decision maker may determine the cause of each mode by observing individual product performance for each criteria and the circumstances driving each individual product's performance in tooltip 222. For example, data related to a product in the adsorption category, ion exchange with Purolite A532E, is provided in tooltip 222 on the right in FIG. 2F.

In some embodiments, individual data points on criteria graphs 204 and/or option graphs 202 may be colored to illustrate acceptable versus unacceptable options, similar to the coloring of frequency distributions 206 and 208 on graphs 202 and 204 described above with respect to FIG. 2A. In some embodiments, in toggling to an individual data point view on the display, one or more data points may be selectively highlighted. For example, one or more individual data points (i.e., remediation technology products) which satisfy each of the desired evaluation criteria and satisfaction thresholds perceived by the user may be highlighted on a given criteria graph 204 and/or technology graph 202. Thus, if a user is interested in a specific outcome/case contributing to a distribution, the highlighting may serve as a visual cue for the user to view additional information in tooltip 218 for the highlighted outcomes. In some embodiments, additional individual data points which do not meet the criteria and/or satisfaction thresholds may be receded from the user's view, similar to the distribution shading described above with respect to FIG. 2B.

Observing individual products and/or outcomes may allow the decision maker to consider one or more remediation options with regards to specific examples, as opposed to on a high-level with frequency distributions, therefore providing concrete outcomes. Each of the individual data point framing and frequency distribution framing may provide meaningful contributions in aiding the decision maker in selecting one or more suitable remediation options based on multiple criteria.

Figure 3:
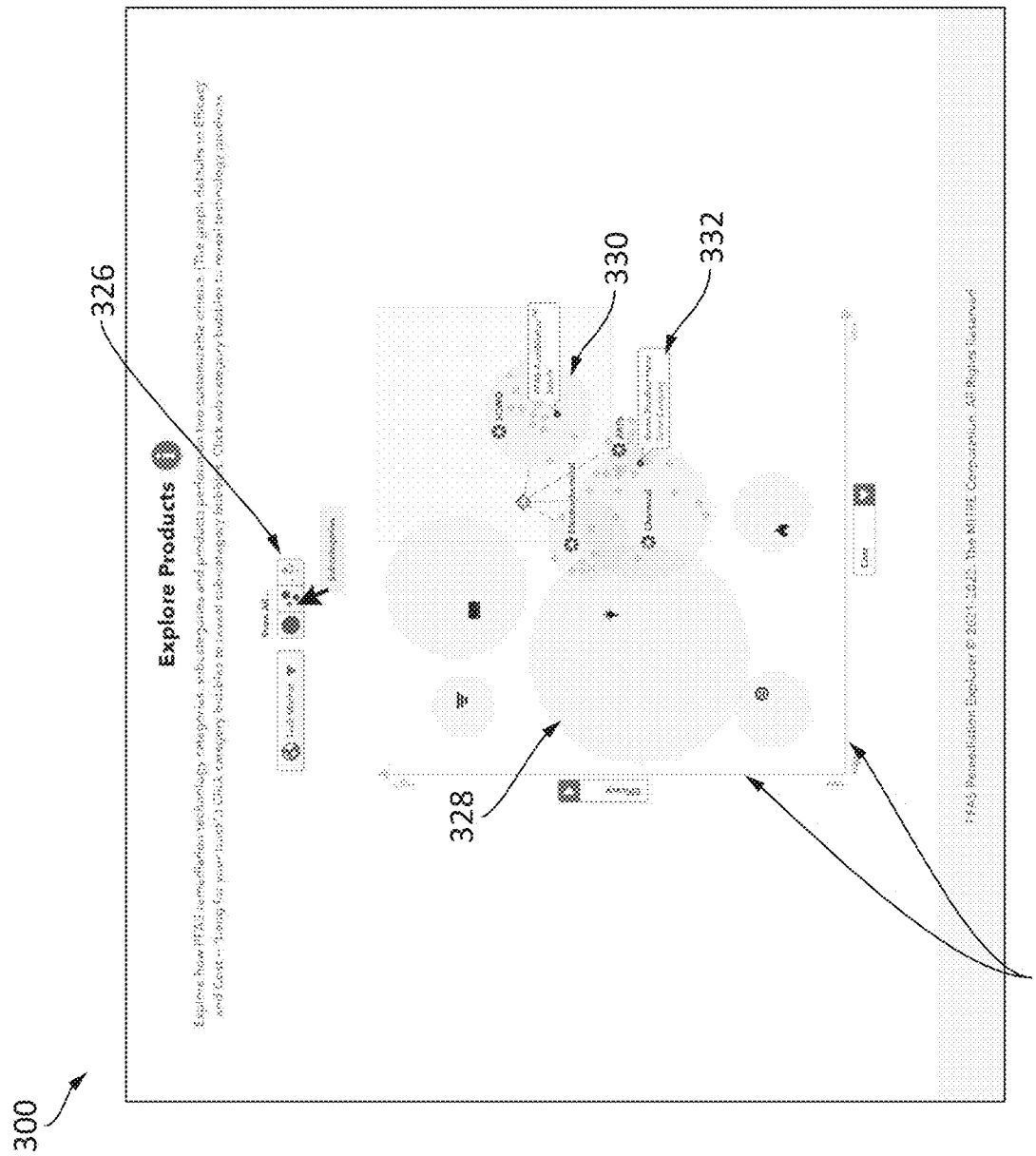
FIG. 3 illustrates a user interface of a PFAS remediation explorer tool for comparing remediation options across two criteria, in accordance with some embodiments.

FIG. 3 illustrates a user interface 300 with a bubble chart for comparing remediation options, in accordance with some embodiments. Bubble charts may allow for an in-depth comparison between remediation categories, sub-categories, and individual products with any of the evaluation criteria in the explorer tool. As shown, a user may select an evaluation criterion for each axis 324 of the bubble chart, such as efficacy and cost, and evaluate the plurality of options against the two selected criteria. The spectrum of each axis 324 may automatically update such that the more desirable attribute related to the criteria (i.e., low cost, high efficacy) is located away from the origin on the plot. In some embodiments, the user may compare options with other criteria, such as volume, waste, or maturity. In some embodiments, the user may toggle between visualizing all of the data in the chart according to categories, sub-categories, or individual points by selecting an option in toolbar 326. Bubble charts may have specific use as a technology tracker in different regional markets, for example.

Each remediation option/category may be illustrated in the bubble chart as a shaded (e.g., grey) circle 328, wherein the size of the circle illustrates product performance within that category. The category associated with each circle 328 may be demonstrated by an icon representative of the given remediation option. In some embodiments, the circle 328 may be labeled with the remediation category title in addition to or in place of the icon. In some embodiments, the icon may be located at the centroid of the circle 328. In some embodiments, the icon may be located elsewhere within the circumference of the circle, or outside of circle 328. When a category circle 328 is selected, the bubble may burst into one or more alternately shaded (e.g., blue) circles 330, representative of sub-categories within the category. In some embodiments, circles 328 and 330 may be differentiated by pattern in addition to/in place of color. The user may be able to automatically visualize individual data points 332 within the sub-category circles 330, or may manually select a sub-category circle to view one or more individual points 332 (i.e., products) within the sub-category. For example, as shown in FIG. 3, a user may select the oxidation category to view one or more sub-categories, such as electrochemical, chemical, and SCWO (supercritical water oxidation). Each sub-category may comprise a plurality of individual products/outcomes. For example, SCWO may comprise a product "PFAS Annihilator." In some embodiments, the user may select one or more data points to view additional information about the selected data points in a tooltip, as described above.

Figure 4:
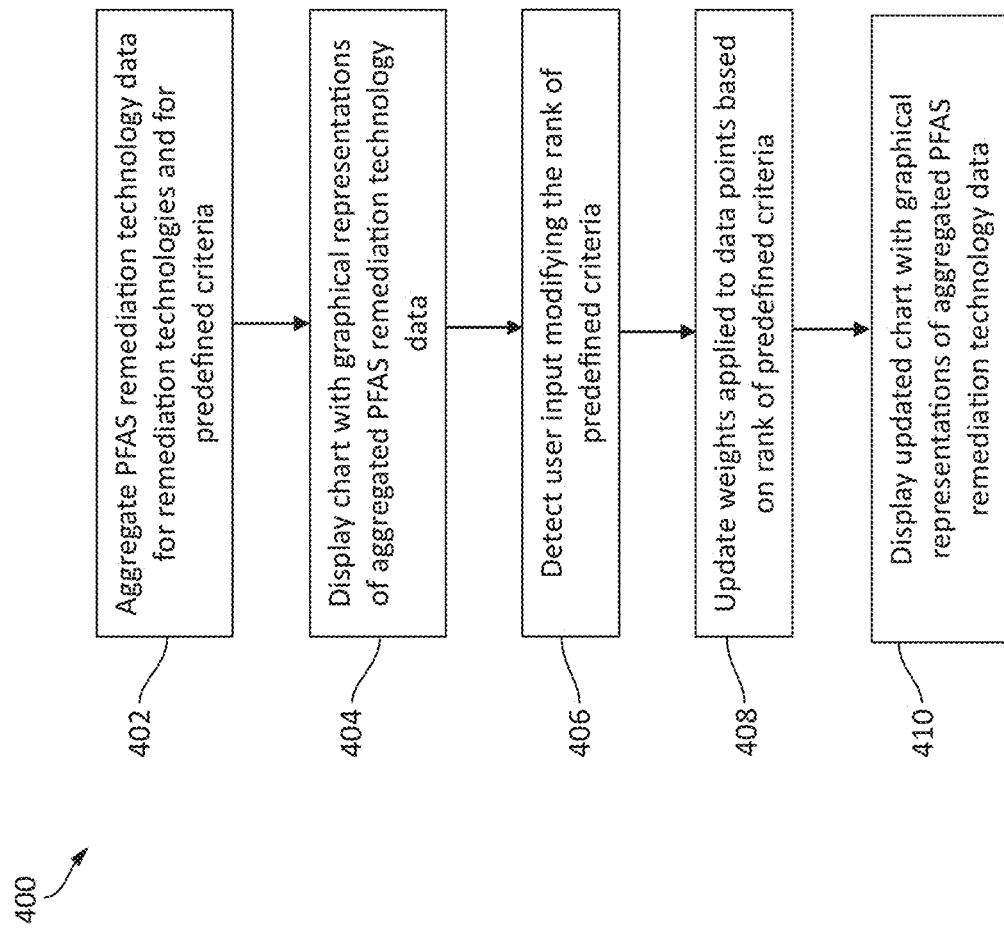
FIG. 4 illustrates a block diagram for using a PFAS remediation explorer tool, in accordance with some embodiments.

FIG. 4 illustrates process diagram 400 for displaying a user modifiable chart comprising a plurality of graphical representations of aggregated PFAS remediation evaluation data, in accordance with some embodiments. At step 402, the system may aggregate data related to potential options for remediating PFAS contamination from a plurality of sources. The remediation evaluation data may be aggregated for multiple options and for multiple predefined evaluation criteria. In some embodiments, remediation options may include categories such as conventional technologies, emerging technologies, adsorption, oxidation, incineration, and membrane filtration. Likewise, evaluation criteria associated with the options may include one or more of efficacy, maturity, waste, cost, and volume.

At step 404, the aggregated data may be displayed in a plurality of graphical representations in a user modifiable chart. Each graphical representation may depict a plurality of data points from one or more data sources, wherein the data points are plotted along vertical axes in the graphical representations with a visual weight. The data points may be illustrated in groups of distributions, wherein the distributions on the graphical representations of the predefined criteria may be grouped by remediation option, and the distributions on the graphical representations of the remediation options may be grouped by criterion. Data points may represent a specific PFAS remediation product and/or outcome. The graphical representations associated with the predefined criteria may be visually ordered in the chart based on a rank assigned to each criterion, and the applied weight may be based on the rank of the predefined criteria.

At step 406, the system may detect a user input modifying the rank of one or more predefined criteria, and in accordance with the input, at step 408 the weight applied to each data point may be automatically updated. Additionally, the visual order of the predefined criteria may be updated based on the user input. In some embodiments, the system may detect an additional user input modifying the satisfaction threshold of at least one graphical representation associated with the predefined criteria. In accordance with the additional user input, the location of a marker and a colored shading on the graphical representation may be automatically updated. Modifying the satisfaction threshold may occur prior to, concurrently with, or after modifying the rank of one or more predefined criteria. In some embodiments, a user may not modify the rank of predefined criteria, but may modify one or more satisfaction thresholds. In some embodiments, a user may not modify the one or more satisfaction thresholds, but may modify the rank of predefined criteria.

At step 410, the system may display an updated user modifiable chart comprising the graphical representations of the aggregated PFAS remediation evaluation data. In some embodiments, the graphical representations may be viewable on a high-level distribution format or on a low-level individual data point format. In some embodiments, the updated user modifiable chart may comprise an updated marker and color shading on the plurality of graphical representations.

Figure 5:
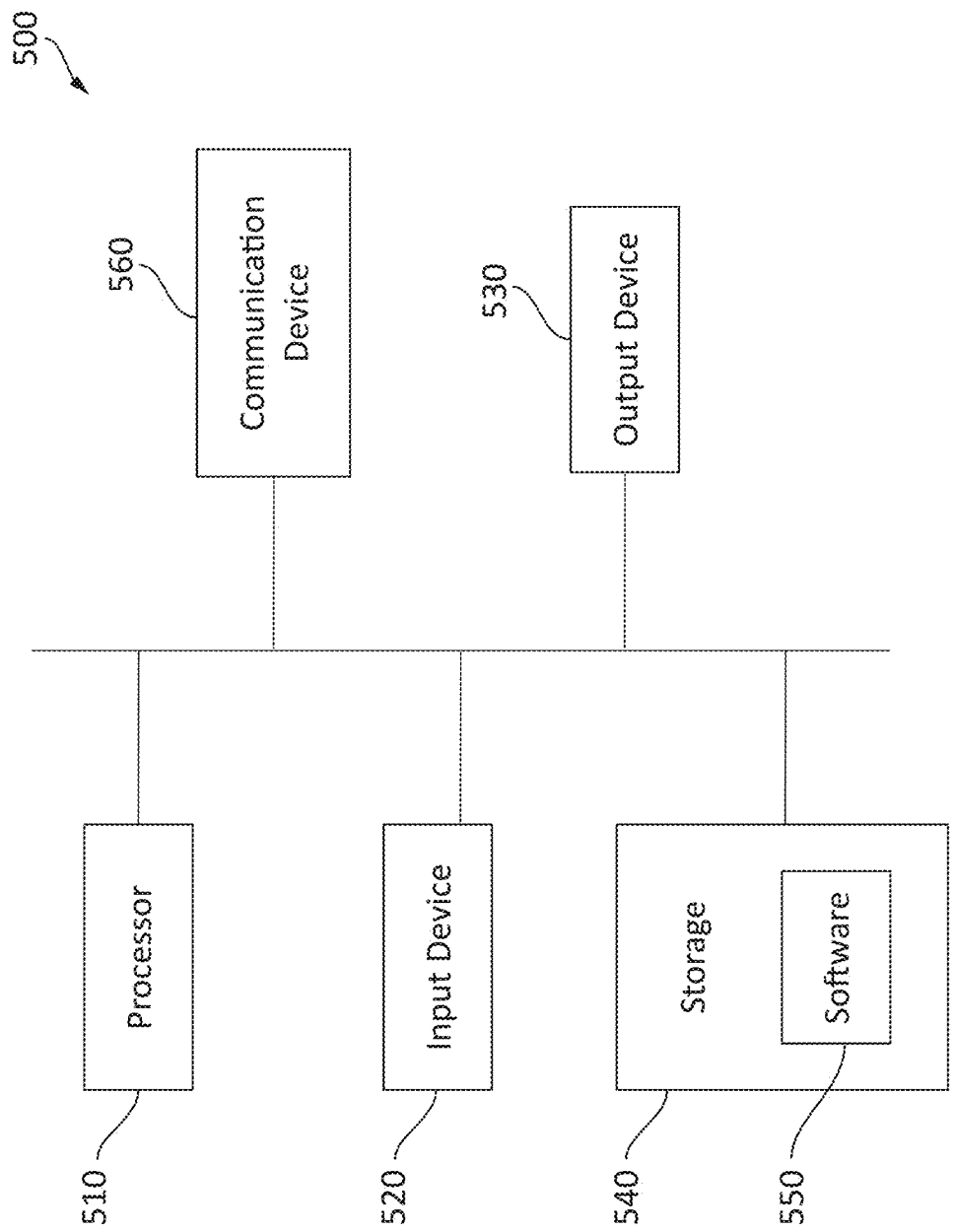
FIG. 5 illustrates an electronic device for use in interacting with a PFAS remediation explorer tool, in accordance with some embodiments.

FIG. 5 illustrates an example of a computing system 500, in accordance with some examples of the disclosure. System 500 can be a client or a server. As shown in FIG. 5, system 500 can be any suitable type of processor-based system, such as a personal computer, workstation, server, handheld computing device (portable electronic device) such as a phone or tablet, or dedicated device. The system 500 can include, for example, one or more of input device 520, output device 530, one or more processors 510, storage 540, and communication device 560. Input device 520 and output device 530 can generally correspond to those described above and can either be connectable or integrated with the computer.

Input device 520 can be any suitable device that provides input, such as a touch screen, keyboard or keypad, mouse, gesture recognition component of a virtual/augmented reality system, or voice-recognition device. Output device 530 can be or include any suitable device that provides output, such as a display, touch screen, haptics device, virtual/augmented reality display, or speaker.

Storage 540 can be any suitable device that provides storage, such as an electrical, magnetic, or optical memory including a RAM, cache, hard drive, removable storage disk, or other non-transitory computer readable medium. Communication device 560 can include any suitable device capable of transmitting and receiving signals over a network, such as a network interface chip or device. The components of the computing system 500 can be connected in any suitable manner, such as via a physical bus or wirelessly.

Processor(s) 510 can be any suitable processor or combination of processors, including any of, or any combination of, a central processing unit (CPU), field programmable gate array (FPGA), and application-specific integrated circuit (ASIC). Software 550, which can be stored in storage 540 and executed by one or more processors 510, can include, for example, the programming that embodies the functionality or portions of the functionality of the present disclosure (e.g., as embodied in the devices as described above)

Software 550 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 500 can implement any operating system suitable for operating on the network. Software 550 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A computer-implemented method for displaying a user modifiable chart comprising a plurality of graphical representations of aggregated per- and polyfluoroalkyl substances (PFAS) remediation evaluation data, the method comprising:
   aggregating PFAS remediation evaluation data comprising a plurality of remediation options and a plurality of predefined criteria for evaluating the plurality of remediation options;
   graphically displaying the user modifiable chart comprising the plurality of graphical representations of the aggregated PFAS remediation evaluation data, wherein:
      each graphical representation depicts data points visually plotted with weights,
      each data point represents an individual PFAS remediation outcome contributing to at least one remediation option being evaluated,
      the plurality of graphical representations for the plurality of predefined criteria are visually ordered according to a rank of the plurality of predefined criteria, and
      the weights are based on the rank of the plurality of predefined criteria;
   detecting a first user input modifying the rank of at least one predefined criterion;
   in accordance with the first user input, automatically updating the weights of the data points; and
   displaying an updated user modifiable chart comprising the plurality of graphical representations of the aggregated PFAS remediation evaluation data.

2. The method of claim 1, including, in accordance with the first user input, automatically updating the visual order of the plurality of graphical representations for the plurality of predefined criteria.

3. The method of claim 2, including displaying the updated user modifiable chart comprising the updated visual order of the plurality of graphical representations for the plurality of predefined criteria.

4. The method of claim 1, wherein each graphical representation for the plurality of predefined criteria comprises a user modifiable satisfaction threshold.

5. The method of claim 4, wherein the user modifiable satisfaction thresholds distinguish between more desirable and less desirable plotted data points.

6. The method of claim 4, including detecting a second user input modifying the satisfaction threshold of at least one graphical representation.

7. The method of claim 6, including, in accordance with the second user input, automatically updating a location of a marker and a colored shading on the plurality of graphical representations.

8. The method of claim 7, including displaying the updated user modifiable chart comprising the updated marker and the updated colored shading on the plurality of graphical representations.

9. The method of claim 7, wherein the colored shading in a first direction from the marker is a first color, and the colored shading in a second direction from the marker is a second color.

10. The method of claim 1, wherein the plurality of remediation options includes conventional technologies, emerging technologies, adsorption, oxidation, incineration, and membrane filtration.

11. The method of claim 1, wherein the plurality of predefined criteria includes efficacy, maturity, waste, cost, and volume.

12. The method of claim 1, wherein each graphical representation depicts the data points in one or more frequency distributions on a vertical axis.

13. The method of claim 1, wherein a location of the data point on a graphical representation of the aggregated data is based on performance of the PFAS remediation outcome.

14. The method of claim 13, wherein a first direction of the plurality of graphical representations depicts better performance, and a second direction of the plurality of graphical representations depicts worse performance.

15. The method of claim 13, wherein the performance is normalized for comparing the plurality of remediation options based the plurality of predefined criteria.

16. The method of claim 1, wherein a first graphical representation of the aggregated PFAS remediation evaluation data comprises a first set of data points in a first category of remediation options.

17. The method of claim 16, wherein a second graphical representation of the aggregated PFAS remediation evaluation data comprises a second set of data points evaluated based on a first predefined criterion.

18. The method of claim 17, wherein a portion of the second set of data points overlaps with the first set of data points.

19. The method of claim 1, wherein a format of the plurality of graphical representations is interchangeable between frequency distributions and individual data points based on user selection.

20. The method of claim 1, including detecting a third user input selecting a button on the display for changing the displayed user modifiable chart.

21. The method of claim 20, including, in accordance with the third user input, displaying a bubble chart comparing the plurality of remediation options based on two evaluation criteria of the plurality of evaluation criteria.

22. The method of claim 21, wherein each of the two evaluation criteria are interchangeable for a different evaluation criteria of the plurality of evaluation criteria.

23. A system for displaying a user modifiable chart comprising a plurality of graphical representations of aggregated per- and polyfluoroalkyl substances (PFAS) remediation evaluation data, the system comprising:
   a display; and
   one or more processors configured to cause the system to:
      aggregate PFAS remediation evaluation data comprising a plurality of remediation options and a plurality of predefined criteria for evaluating the plurality of remediation options;
      graphically display the user modifiable chart comprising the plurality of graphical representations of the aggregated PFAS remediation evaluation data, wherein:

each graphical representation depicts data points visually plotted with weights, each data point represents an individual PFAS remediation outcome contributing to one or more remediation options being evaluated, the plurality of graphical representations for the plurality of predefined criteria are visually ordered according to a rank of the plurality of predefined criteria, and the weights are based on the rank of the plurality of predefined criteria;

detect a first user input modifying the rank of at least one predefined criterion;

in accordance with the first user input, automatically update the weights of the data points; and display an updated user modifiable chart comprising the plurality of graphical representations of the aggregated PFAS remediation evaluation data.

24. A non-transitory computer-readable storage medium storing instructions for displaying a user modifiable chart comprising a plurality of graphical representations of aggregated per- and polyfluoroalkyl substances (PFAS) remediation evaluation data, the instructions executable by a system, the system comprising a display and one or more processors, wherein execution of the instructions by the system causes the system to:

aggregate PFAS remediation evaluation data comprising a plurality of remediation options and a plurality of predefined criteria for evaluating the plurality of remediation options;

graphically display the user modifiable chart comprising the plurality of graphical representations of the aggregated PFAS remediation evaluation data, wherein:

each graphical representation depicts data points visually plotted with weights, each data point represents an individual PFAS remediation outcome contributing to one or more remediation options being evaluated, the plurality of graphical representations for the plurality of predefined criteria are visually ordered according to a rank of the plurality of predefined criteria, and the weights are based on the rank of the plurality of predefined criteria;

detect a first user input modifying the rank of at least one predefined criterion;

in accordance with the first user input, automatically update the weights of the data points; and display an updated user modifiable chart comprising the plurality of graphical representations of the aggregated PFAS remediation evaluation data.

\* \* \* \* \*